Feb. 18, 1941.     M. KATCHER     2,232,113
VALVE FOR HYDRAULIC BRAKE SYSTEMS
Filed Dec. 26, 1939
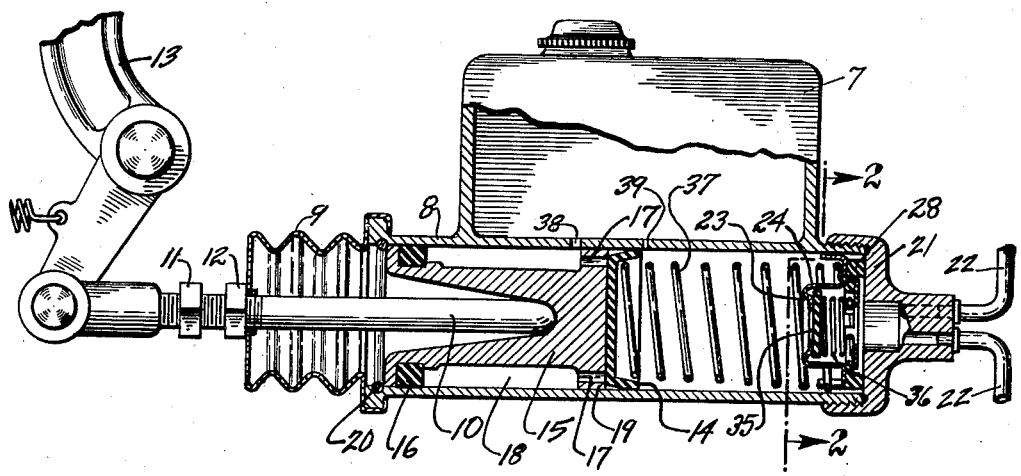
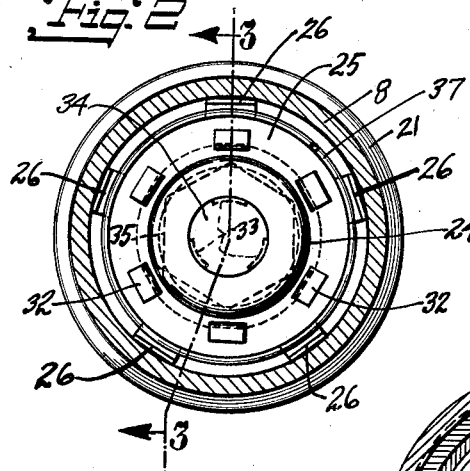
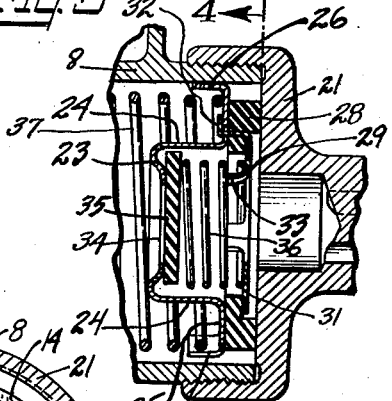
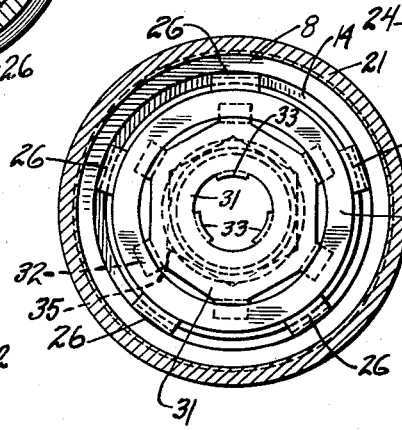
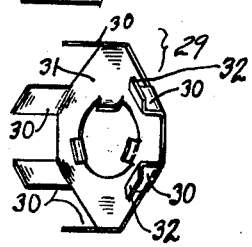
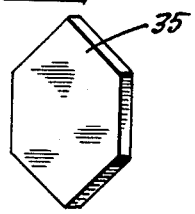
INVENTOR
*Morris Katcher*
BY
*Emanuel Scheyer*
ATTORNEY Patented Feb. 18, 1941

2,232,113

UNITED STATES PATENT OFFICE 2,232,113

VALVE FOR HYDRAULIC BRAKE SYSTEMS

Morris Katcher, New York, N. Y.

Application December 26, 1939, Serial No. 310,937

6 Claims. (Cl. 277—45)

This invention relates to improvements in valves used in the master cylinder of hydraulic brake systems wherein said valve is actuated by movement of a piston mounted within the cylinder to regulate the pressure within fluid pressure lines and interconnected wheel cylinders. In order to prevent air from entering the system at the wheel brake cylinders, it is desirable to maintain a higher than atmospheric pressure in the wheel brake cylinders and the fluid conduits leading thereto from the master cylinder. For this purpose a double acting valve is provided at the discharge end of the master cylinder, allowing the fluid to leave the cylinder freely but restraining its return to the cylinder to maintain a predetermined pressure in the wheel brake cylinders and fluid conduits.

Other objects and advantages will become apparent upon further study of the description and drawing, in which—

Fig. 1 is a longitudinal section through the reservoir and operating cylinder of the pressure producing mechanism.

Fig. 2 is a cross section taken along the line 2—2 of Fig. 1.

Fig. 3 is a partial longitudinal section taken along the line 3—3 of Fig. 2.

Fig. 4 is a cross section taken along the line 4—4 of Fig. 3.

Fig. 5 is a perspective view of the cage for supporting the gasket of the valve, said cage having some of the prongs unbent as before assembly, and Fig. 6 is a perspective view of the valve plate.

Reservoir 7 for holding brake fluid is formed on the outside of cylinder 8. A flexible boot 9 is attached to the left end of cylinder 8. Passing through boot 9 is a piston rod 10. Nuts 11 and 12, threaded on rod 10, tightly grip boot 9 where rod 10 passes through to prevent leakage. The outer end of rod 10 is operated by brake pedal 13, the inner end of the rod engaging piston 15. The forward end of piston 15 is provided with a gasket 16 while its rear has a collar 19 formed thereon which carries a rubber cup washer 14. Ports 17 are provided in collar 19, extending from in front of washer 14 to the annular space 18 around the piston. The forward motion of piston 15 is limited by wire ring 20 set in a groove formed in cylinder 8. Cylinder head 21 which carries the pressure transmitting tubes 22 is screwed on the body of the cylinder.

Sheet metal valve frame 23 has a cylindrical or annular side wall 24 and a rear radially extending flange 25. Extending radially outward and forward of flange 25 are five centering angles or lugs 26 for maintaining frame 23 axially slidable in its central position in cylinder 8. Mounted on the rear face of flange 25 is an annular gasket 28 of rubber or like resilient material held in position thereon by a sheet metal cage 29. Cage 29 has a web 31 and plurality of forwardly extending prongs 30 which pass through gasket 28 at the junction of its outer thick portion with its inner thin portion. Prongs 30 pass through slits provided in flange 25 and have their forward ends bent over to form tongues 32, causing the inner thin portion of gasket 28 to be squeezed between web 31 and flange 25. Extending radially inward and forward of web 31 are three curved lugs 33. In Fig. 5, cage 29 is shown by itself, four of the prongs 30 being shown before their ends are bent over to form tongues 32, two of them being so bent. When cage 29 is in position on gasket 28 and flange 25, all six of the prongs 30 have tongues 32 bent over from them. Mounted inside of cylindrical wall 24 and held against frame 23 at the rear of the opening 34 is a hexagonal plate 35 of hard rubber, fiber or the like. Spring 36, extending between plate 35 and web 31, holds plate 35 against frame 23 at opening 34. Lugs 33 center spring 36 on web 31. A spring 37 extends between cup washer 14 on piston 15 and flange 25 of valve frame 23, holding gasket 28 tight against cylinder head 21.

When pedal 13 is depressed, rod 10 is pushed to the rear, forcing piston 15 inward or to the rear in cylinder 8 against spring 37. As cup washer 14 is pushed inward against the liquid in cylinder 8 its sides open up preventing passage of liquid to the rear of it and through ports 17. The inward motion of piston 15 draws liquid into space 18 through port 38 between cylinder 8 and reservoir 7 and cuts off port 39 preventing the flow of liquid from the cylinder into the reservoir. The liquid in the cylinder to the rear of washer 14 is forced through opening 34 in frame 23 past plate 35, forcing the latter back against the pressure of spring 36, through cylinder head 21 into pressure tubes 22 and from thence into the brake system. It is to be noted that the polygonal shape of plate 35 provides space between its flat sides and the inside of cylindrical wall 24, while the corners serve as guides. When pedal 13 is released spring 37 pushes forward piston 15 until stopped by wire ring 20. When this occurs, the liquid returning from the brake system through tubes 22, lifts the valve formed by frame 23, plate 35 and gasket 28 from its seat on cylinder head 21 and flows past said valve into cylinder 8. Due to its forward motion, the sides of washer 14 are pushed radially inward as liquid flows past it from space 18 and ports 17. Liquid is also brought into the piston through port 39 from reservoir 7 when the pressure in the piston becomes low enough. Liquid continues to pass into cylinder 8 past gasket 28 from tubes 22 until the pressure in said tubes and the brake system has dropped to about 10 lbs., when frame 23 and the gasket 28 are forced back by spring 37 against cylinder head 21 stopping further reduction in pressure. Spring 37 is made with the proper strength to effect this.

I claim:

1. A valve mechanism for the master cylinder of a hydraulic brake system comprising a frame slidably mounted in the cylinder and having an opening for the passage of fluid therethrough, a member for tightly closing said opening against fluid entering the cylinder, spring means yieldingly seating said member on the frame against pressure of fluid leaving the cylinder, said frame having a radially extending portion, an annular gasket of flexible resilient material set on the rear face of said portion, a cage set on the rear of the gasket having prongs extending forward passing through the gasket and said portion, said prongs being deformed at their forward ends for clamping the gasket to said portion, and spring means extending forward in the cylinder engaging the frame for yieldingly maintaining the gasket against a seat in the rear cylinder end, the rear cylinder end having a port yieldingly closed by said frame with the gasket and said member.

2. A valve mechanism for the master cylinder of a hydraulic brake system comprising a frame slidably mounted in the cylinder and having an opening for the passage of fluid therethrough, a member for closing said opening against fluid entering the cylinder, spring means yieldingly seating said member on the frame against pressure of fluid leaving the cylinder, said frame having a radially extending portion, an annular gasket of flexible, resilient material set on the rear face of said portion, a cage set on the rear of the gasket having prongs extending forward passing through the gasket and said portion, said prongs being deformed at their forward ends for clamping the gasket to said portion, said gasket having an outer annular part thicker than its inner part, said outer part extending to the rear of said inner part, the cage being set on the gasket at its thinner part, and spring means extending forward in the cylinder engaging the frame for yieldingly maintaining the thicker part of the gasket against a seat in the rear cylinder end, the rear cylinder end having a port yieldingly closed by said frame with the gasket and said member.

3. A valve mechanism as claimed in claim 1 in which the cage has a radially extending web with an opening therein in communication with the opening in the frame, the web being set on the gasket and the prongs extending forward from the web.

4. A valve mechanism for the master cylinder of a hydraulic brake system comprising a frame slidably mounted in the cylinder and having an opening for the passage of fluid therethrough, a member for tightly closing said opening against fluid entering the cylinder, said frame having an annular radially extending portion, an annular flexible resilient gasket set on the rear face of said portion, a cage with an annular web portion set on the rear face of the gasket, prongs extending forward from the web of the cage, said prongs passing through the gasket and said portion, the forward ends of the prongs being deformed for preventing their removal from said portion, the web portion of the cage having a portion extending radially inward from the gasket, and spring means reacting against said member and said latter portion for yieldingly seating said member on the frame at said opening against pressure of fluid leaving the cylinder.

5. A valve mechanism for the master cylinder of a hydraulic brake system comprising a frame having a radially extending front face with an opening therein, an annular wall extending to the rear axially along the cylinder from said face, radially disposed means extending outward from said wall for slidably mounting the frame in the cylinder, said radially disposed means allowing space for the passage of fluid by it, an annular gasket set on said radially disposed means and extending to the rear thereof, a cage attached to said frame, said cage having a part at the rear of the gasket fastening the latter to said radially disposed means, a portion of said cage extending inside of said annular wall, said radially disposed means providing a seat for spring means, said spring means extending forward in the cylinder and yieldably maintaining the gasket against a seat in the rear cylinder end, a member inside said annular wall seating on the rear of said face at its opening, and spring means inside the annular wall reacting at one end against the portion of the cage inside said annular wall and at the other end against said member for yieldingly seating it on said face and closing off said opening, the rear cylinder end having a port closed by said frame with its gasket and the member seated on the rear of said face.

6. A valve mechanism for the master cylinder of a hydraulic brake system comprising a frame having a radially extending front face with an opening therein, an annular wall extending to the rear axially along the cylinder from said face, radially disposed means extending outward substantially at the rear of said wall for slidably mounting the frame in the cylinder, said radially disposed means allowing space for the passage of fluid by it, an annular gasket set on said radially disposed means and extending to the rear thereof, a cage attached to said frame, said cage having a web at the rear of the gasket holding the latter against said radially disposed means, lugs inside said axial wall extending radially inward and axially forward from said web, said radially disposed means providing a seat for spring means, said spring means extending forward in the cylinder and yieldably maintaining the gasket against a seat in the rear cylinder end, a member inside said annular wall seating on the rear of said face at its opening, and spring means inside the annular wall reacting at its rear end against the cage and at its forward end against said member for yieldingly seating it on said face and closing off said opening, said lugs maintaining the latter spring means in its radial position, the rear cylinder end having a port closed by said frame with its gasket and the member seated on the rear of said face.

MORRIS KATCHER.